United States Patent [19]

Mitchell

[11] Patent Number: 5,232,005

[45] Date of Patent: Aug. 3, 1993

[54] UNIVERSAL CANOPY FOR ALL RIDING LAWN MOWERS

[76] Inventor: Charles N. Mitchell, 210 N. Seminary, Florence, Ala. 35630

[21] Appl. No.: 650,409

[22] Filed: Feb. 4, 1991

[51] Int. Cl.⁵ .............................................. E04H 15/06
[52] U.S. Cl. ................................... 135/88; 224/47.45
[58] Field of Search .............................. 135/88, 20.1; 224/42.45, 42.07

[56] References Cited

U.S. PATENT DOCUMENTS

| | | | |
|---|---|---|---|
| 490,229 | 1/1893 | Hohenstein | 135/88 |
| 494,556 | 4/1893 | Doyle | 135/88 |
| 869,061 | 10/1907 | Cox | 135/88 |
| 2,641,770 | 6/1953 | Chapin | 135/88 |
| 2,756,760 | 7/1956 | LaGrotteria | 135/20.1 |
| 2,984,249 | 5/1961 | Sears | 135/88 |
| 4,136,806 | 1/1979 | Wisz | 224/42.45 |
| 4,915,276 | 4/1990 | Devito | 224/42.45 |
| 4,927,117 | 5/1990 | Gainey | 135/88 |
| 5,022,420 | 6/1991 | Brim | 135/88 |

FOREIGN PATENT DOCUMENTS

| | | | |
|---|---|---|---|
| 2709378 | 7/1978 | Fed. Rep. of Germany | 135/88 |
| 406765 | 12/1943 | Italy | 135/88 |
| 24565 | of 1898 | United Kingdom | 135/88 |

Primary Examiner—Henry E. Raduazo

[57] ABSTRACT

A universal canopy for all riding mowers front and rear engine types. A horizontal base bolts on to an implement hitch. Two holes bored at the most distant point possible above said implement hitch depending on said riding mower design is for two bolts that fasten adjustable tubes to said riding mower and secured to a vertical base for maximum strength and stability resulting in a three point mount. Adjustable sleeves on said vertical base move in a vertical manner plus special hinges attached on to said adjustable sleeves allow three hundred and sixty degree movement of said adjustable tubes to make said vertical base very universal. Also said adjustable tubes telescope in side of sleeves for adjustment and are secured in place by set screws to make said vertical base even more universal for all of said riding mower designs. Two tubing supports for said canopy telescopes inside two vertical tubes that serve as said vertical base to give the desired height of said canopy. A top frame for said canopy telescopes inside of adjustable sleeves fixed horizontally on a cross member joined to said tubing supports. All adjustable entities are secured in place by set screws. Said canopy is secured to said top frame by way of snaps.

2 Claims, 4 Drawing Sheets

UNIVERSAL CANOPY FOR ALL RIDING LAWN MOWERS

FIELD OF INVENTION

Riding mower accessory.

BACKGROUND OF THE INVENTION

This invention relates to riding mowers and more particularly to a canopy having a mounting base so universal that it can be easely attached securly to any riding mower regardless of style. Riding mower implement hitches are so flimsey that to try to mount a canopy on said riding mowers with out braces at a point above said implement hitch connecting said riding mower to said mounting base would be like fishing with the small end of a pole, in other words it would be very unstable.

SUMMARY OF THE INVENTION

Riding mowers have been on the market for many years. When said riding mowers first came on the market most individuals were content to have a means for cutting the grass the easy way, so over a period of time people became more health conscious about the effects of too much sun exposure and the increased risk of skin cancer. From that consciousness came the recognized need of getting protection from the sun in everyday life including protection when mowing the lawn.

DESCRIPTION OF THE PREFERRED EMBODIMENT

Figure 2:
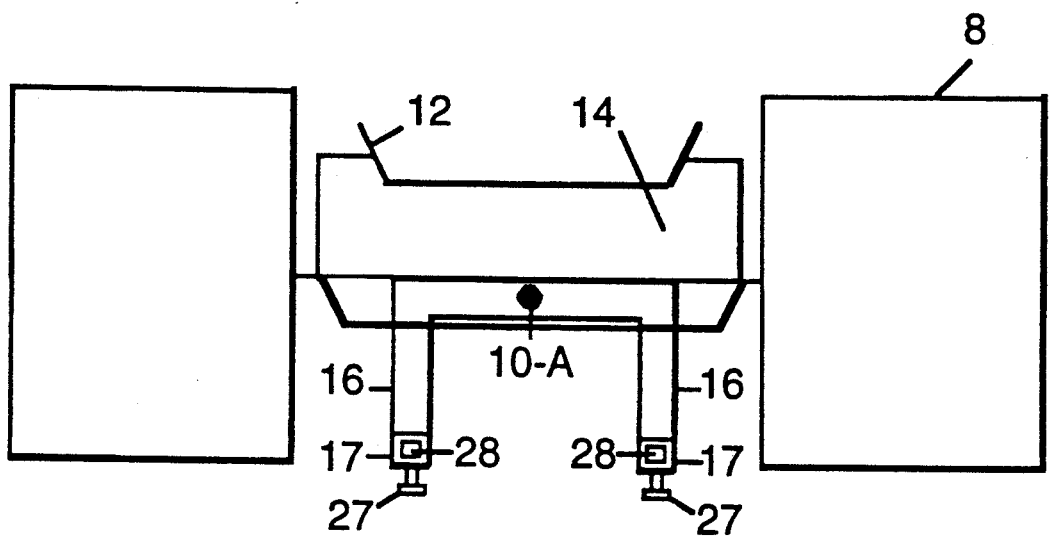
FIG. 2 is a top plan view of the rear section of a riding mower with a horizontal base supporting two vertical tubes and two tubing supports with said horizontal base attached to the implement hitch aperture.
Figure 1:
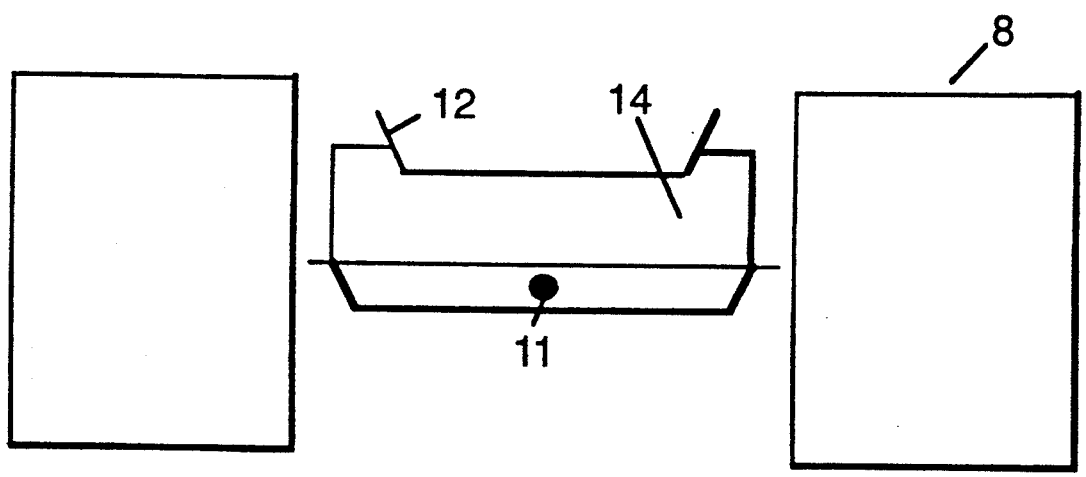
FIG. 1 is a top plan view of the rear section of a riding mower and of the implement hitch aperture that is provided.
Figure 5:
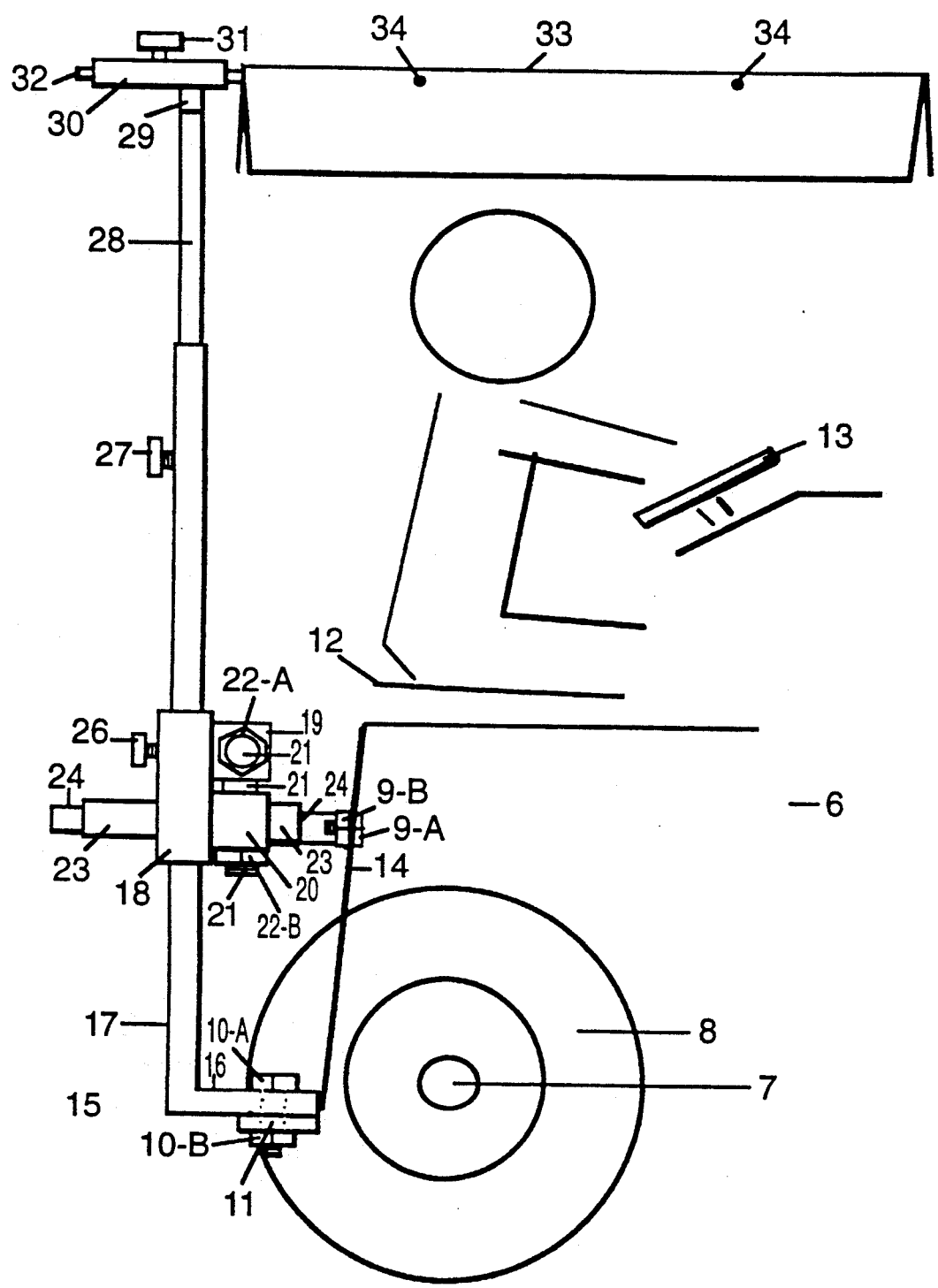
FIG. 5 is a side elevational view of the invention mounted on a riding mower.

The invention will now be disclosed in more detail with reference to the drawings. In FIG. 5 there is shown the mid section 6, and the rear section 14 of a typical riding mower. This consists of a seat 12, and a steering wheel 13. This is all supported by a wheel 8 by way of an axle 7. Also shown in FIG. 5 in the said rear section 14 is at least one aperture 11 therein. It is this said aperture 11 that is used for the attachment of different accessory implements to said riding mower. Said rear section 14 and said aperture 11 are shown in more detail in FIG. 1. In FIG. 1 there is shown an overhead view of said rear section 14 and said aperture 11 that together in combination serve as an implement hitch.

Since both sides of the preferred embodiment structure are identical it will be described in a singular manner for the remainder of the description except for the description of canopy snaps.

FIG. 5 shows a mounting base having a horizontal 16 and a vertical 17 tube with said vertical tube fixed in relationship to said horizontal tube and said horizontal base attached by way of an aperture 15 in said horizontal base 16 to an aperture 11 on the rear area of a riding mower that is refered to as an implement hitch and secured in place by a bolt 10a and nut 10b combination.

Figure 3:
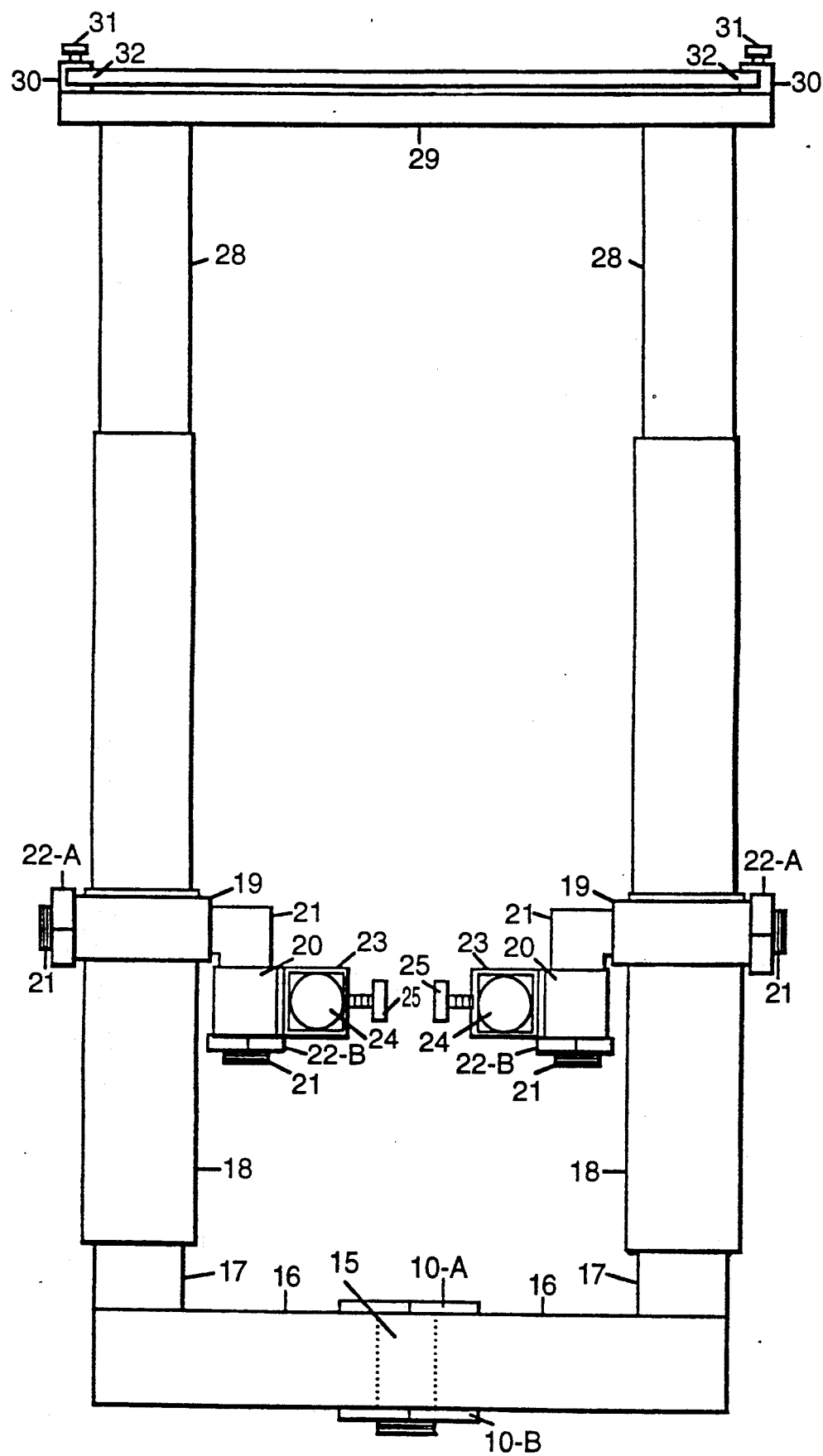
FIG. 3 is a front elevational view of the invention.
Figure 4:
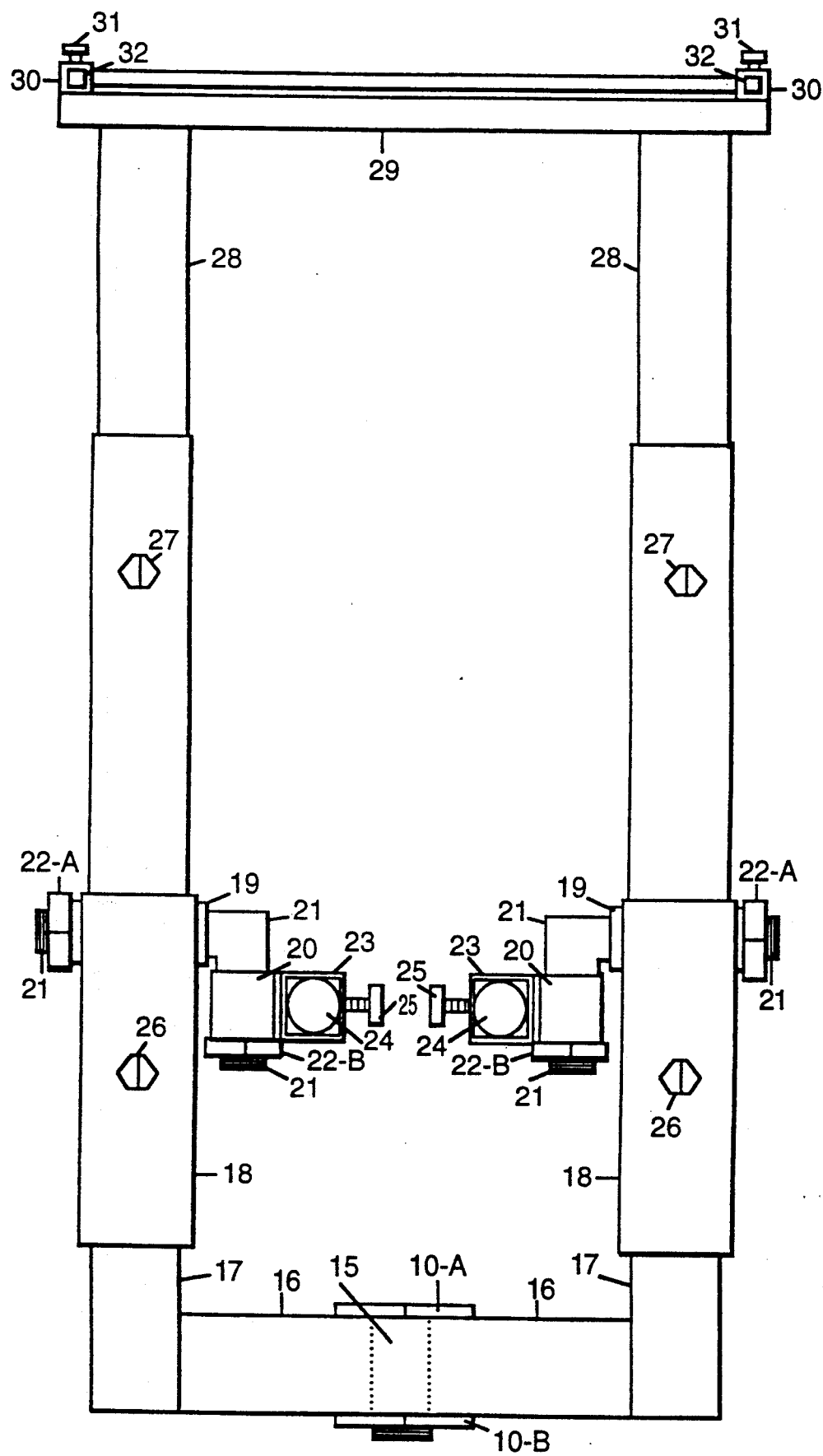
FIG. 4 is a rear elevational view of the invention.

Said vertical base 17 joined to said horizontal base 16 is enveloped by a fixing means consisting of a sleeve 18 and a set screw 26 to secure said sleeve 18 in place and is vertically adjustable with regard to said vertical base 17 so as to give any desired height for various said riding mower designs, and connected to said fixing means sleeve 18 a sleeve 19 that envelops one end of a L shaped rod 21 and secured by a fastener 22a and the other end of said L shaped rod 21 is enveloped by a sleeve 20 and secured by a fastener 22b in order to give three hundred and sixty degree movement of an adjustable tube 24, and connected to said sleeve 20 a sleeve 23 that will telescopically receive said adjustable tube 24, and as is shown in FIGS. 3 and 4 said adjustable tube 24 is secured in place by a set screw 25 on said sleeve 23 for adjustably connecting to various said riding mower designs, and as is shown in FIG. 5 is connected at a point above said implement hitch to the rear area of said riding mower by way of a bolt 9a and nut 9b combination. FIG. 5 shows said vertical base 17 is adapted to telescopically receive a tubing support 28 and said tubing support 28 is secured in place by a set screw 27 on said vertical base 17 as a fixing means to give the desired height of a canopy 33. Said tubing support 28 is connected to a cross member 29 that is connected to a sleeve 30 that a canopy frame 32 end fits in too to be secured by a set screw 31. Said canopy 33 is secured in place by snaps that snap on to said canopy frame 32.

While the above description contains many specificities, these should not be construed as limitations on the scope of the invention, but rather as an exemplification of one preferred embodiment thereof; Many other variations are possible. For example, rather than holding adjustable entities in place by set screws there could be numerous holes bored in all of said adjustable entities to fasten in said place with bolts through said adjustable entities or through a cross bar with out said adjustable entities, or said adjustable entities could be held by a wedge device or clamps to hold in said place, or adjustable entities could be prefixed by a weld for specific groups of riding mowers that have identical designs, also said base could be attached at a point above or below said implement hitch aperture. The invention is not confined to an implement or accessory hitch at any certain position or point on said riding mower. said adjustable tube could be attached to the fenders on said riding mower instead of on the rear section.

The invention can be constructed from any form of tubing, square, round, rectangular, also any type material, steel, aluminum, plastic or any material that is suitable.

Canopy top can be made of cotton, jute, flax, hemp or from any material that would protect against the elements.

Accordingly, the scope of the invention should be determined not by the embodiment illustrated, but by the appended claims and their legal equivalents.

I claim:

1. In combination a base and a canopy having at least one tubing support, for mounting on a riding mower having an implement hitch and a vertically spaced mounting means said combination comprising:

a mounting base for receiving said at least one tubing support said mounting base having a horizontal tube adapted to engage said implement hitch, at least one vertical tube fixed on said base in relationship to said horizontal tube and adapted to telescopically receive said at least one tubing support, a fixing means adjustably, vertically spaced from said horizontal tube along said at least one vertical tube, at least one adjustable tube which is adjustably fixed to said fixing means and adapted to adjustably engage said vertically spaced mounting means, and a second fixing means provided on said at least one vertical tube for adjustably fixing said at least one tubing support whereby the height of said canopy and the mounting base may be adjusted to mount on a wide range of riding mowers having different hitch and mounting means configurations.

2. A base and canopy as in claim 1 wherein there are two vertical tubes and two tubing supports.

* * * * *